US010643187B2

(12) United States Patent
Barkat et al.

(10) Patent No.: US 10,643,187 B2
(45) Date of Patent: May 5, 2020

(54) REPORTING AND PRIORITIZING FAULTS FOR AIRCRAFT DOWNTIME REDUCTION

(71) Applicant: Kiddie Technologies, Inc., Wilson, NC (US)

(72) Inventors: Mohammad Adil Barkat, Bangalore (IN); Vivek Karan, Jharkhand (IN); Pradeep Kumar Nandakumar, Bangalore (IN)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 208 days.

(21) Appl. No.: 15/711,262

(22) Filed: Sep. 21, 2017

(65) Prior Publication Data

US 2019/0087789 A1  Mar. 21, 2019

(30) Foreign Application Priority Data

Jun. 9, 2017  (IN) .............................. 201711020310

(51) Int. Cl.
*G06Q 10/00*  (2012.01)
*G06F 7/08*  (2006.01)
(Continued)

(52) U.S. Cl.
CPC ............... *G06Q 10/20* (2013.01); *G06F 7/08* (2013.01); *G06N 5/04* (2013.01); *G06N 20/00* (2019.01);
(Continued)

(58) Field of Classification Search
CPC ............ G06Q 10/20; B64D 2045/0085; G05B 23/0283; G07C 5/006; G07C 5/0808; G07C 5/0841; G07C 5/0816
See application file for complete search history.

(56) References Cited

U.S. PATENT DOCUMENTS 4,675,675 A  6/1987  Corwin et al.
4,943,919 A  7/1990  Aslin et al.
(Continued)

FOREIGN PATENT DOCUMENTS

EP  3040863 A1 *  6/2016  .............. G06F 11/07

OTHER PUBLICATIONS

Hardeman, Terence, Biting into false alarms Flight International, Mar. 20, 1996 (Year: 1996).*
(Continued)

*Primary Examiner* — Scott L Jarrett
(74) *Attorney, Agent, or Firm* — Cantor Colburn LLP

(57) ABSTRACT

Disclosed is a computer-implemented method for maintenance planning for an aircraft. The method includes retrieving, via a processor, a data transmission comprising a plurality of component faults from an aircraft processor while the aircraft is in flight. The processor executes, using a prediction engine, a predictive fault list based on the component faults. The predictive fault list includes a plurality of weighted predictions of authentic component faults and nuisance component faults. The processor prioritizes the weighted predictions of authentic component faults, and generates a maintenance checklist prioritized based on the weighted prediction of authentic component faults. The processor then outputs the prioritized maintenance checklist on an operatively connected maintenance planning device.

14 Claims, 9 Drawing Sheets

(51) Int. Cl.
*G06Q 10/06* (2012.01)
*G06N 5/04* (2006.01)
*G07C 5/08* (2006.01)
*G06N 20/00* (2019.01)
*G07C 5/00* (2006.01)

(52) U.S. Cl.
CPC ....... *G06Q 10/06316* (2013.01); *G07C 5/008* (2013.01); *G07C 5/0808* (2013.01); *G07C 5/0841* (2013.01)

(56) References Cited

U.S. PATENT DOCUMENTS

| | | | | |
|---|---|---|---|---|
| 5,311,562 | A * | 5/1994 | Palusamy | G05B 23/0283 376/215 |
| 5,522,026 | A * | 5/1996 | Records | G05B 23/027 340/945 |
| 6,115,656 | A | 9/2000 | Sudolsky | |
| 6,192,325 | B1 * | 2/2001 | Piety | G06N 5/00 702/184 |
| 6,249,755 | B1 * | 6/2001 | Yemini | G06F 11/2257 702/183 |
| 6,301,531 | B1 * | 10/2001 | Pierro | B61L 27/0094 701/31.4 |
| 6,353,779 | B1 | 3/2002 | Simon et al. | |
| 6,574,537 | B2 * | 6/2003 | Kipersztok | G05B 23/0278 701/31.8 |
| 6,748,304 | B2 | 6/2004 | Felke et al. | |
| 6,832,205 | B1 * | 12/2004 | Aragones | G06Q 10/06 705/7.25 |
| 6,892,317 | B1 * | 5/2005 | Sampath | G06F 11/25 714/4.3 |
| 7,065,433 | B2 * | 6/2006 | Basu | G07C 5/006 701/31.9 |
| 7,650,210 | B2 * | 1/2010 | Breed | B60W 50/0205 701/29.1 |
| 7,668,632 | B2 * | 2/2010 | Vian | G07C 5/085 700/26 |
| 7,788,205 | B2 * | 8/2010 | Chalasani | G06Q 10/04 706/48 |
| 8,165,826 | B2 | 4/2012 | Schimert et al. | |
| 8,285,438 | B2 * | 10/2012 | Mylaraswamy | G05B 23/0251 701/29.9 |
| 8,359,134 | B2 * | 1/2013 | Maesono | G07C 5/008 701/29.1 |
| 8,452,475 | B1 | 5/2013 | West et al. | |
| 8,620,714 | B2 * | 12/2013 | Williams | G06Q 10/08 705/7.22 |
| 8,736,464 | B1 * | 5/2014 | Downs Mullen | G01C 23/00 340/521 |
| 8,775,009 | B2 * | 7/2014 | Park | B64G 1/24 701/29.7 |
| 8,849,690 | B1 * | 9/2014 | Yang | G06Q 10/063116 705/7.22 |
| 8,868,287 | B2 | 10/2014 | Delaye et al. | |
| 8,963,741 | B1 * | 2/2015 | Righi | G05B 23/0216 340/945 |
| 9,002,678 | B1 * | 4/2015 | Cheded | G06F 17/18 702/183 |
| 9,008,895 | B2 * | 4/2015 | Patankar | G06Q 10/20 701/29.1 |
| 9,120,271 | B2 | 9/2015 | Bell | |
| 9,399,526 | B2 * | 7/2016 | Cheriere | B64F 5/40 |
| 9,454,855 | B2 * | 9/2016 | Ahn | G07C 5/006 |
| 9,535,808 | B2 * | 1/2017 | Bates | G06F 11/0709 |
| 9,567,106 | B2 * | 2/2017 | Thuong | G01M 17/00 |
| 9,701,420 | B1 * | 7/2017 | Tucker | B64D 45/00 |
| 9,834,317 | B2 * | 12/2017 | Besseau | B64D 45/00 |
| 9,916,194 | B2 * | 3/2018 | Pang | G06F 11/079 |
| 10,049,508 | B2 * | 8/2018 | Jensen | G07C 5/008 |
| 10,096,178 | B2 * | 10/2018 | Safa-Bakhsh | G06F 11/27 |
| 10,289,509 | B2 * | 5/2019 | Xu | G06F 11/008 |
| 10,452,062 | B2 * | 10/2019 | Smit | B64F 5/60 |
| 10,457,423 | B2 * | 10/2019 | Lu | G06Q 10/20 |
| 2001/0032109 | A1 * | 10/2001 | Gonyea | G06Q 10/06 705/400 |
| 2002/0065698 | A1 * | 5/2002 | Schick | B61L 27/0094 705/7.36 |
| 2002/0143421 | A1 * | 10/2002 | Wetzer | G06Q 10/06 700/100 |
| 2002/0183866 | A1 * | 12/2002 | Dean | B61C 17/04 700/26 |
| 2003/0137194 | A1 * | 7/2003 | White | B60L 3/12 307/10.1 |
| 2003/0216881 | A1 * | 11/2003 | Weiss | G06Q 10/06 702/130 |
| 2003/0225466 | A1 * | 12/2003 | Yulevitch | G06K 9/6284 700/80 |
| 2004/0034456 | A1 * | 2/2004 | Felke | G05B 23/0278 701/32.9 |
| 2004/0176887 | A1 | 9/2004 | Kent | |
| 2005/0021212 | A1 * | 1/2005 | Gayme | G06N 5/048 701/99 |
| 2005/0114743 | A1 * | 5/2005 | Moorhouse | H04L 41/06 714/100 |
| 2005/0246590 | A1 * | 11/2005 | Lancaster | G06F 11/076 714/47.2 |
| 2006/0131380 | A1 * | 6/2006 | Forrest | G07F 9/026 235/376 |
| 2006/0131381 | A1 * | 6/2006 | Timmis | G05B 23/0229 235/376 |
| 2007/0288414 | A1 * | 12/2007 | Barajas | G06N 20/00 706/46 |
| 2008/0040152 | A1 * | 2/2008 | Vian | G05B 23/0221 705/2 |
| 2008/0278755 | A1 * | 11/2008 | Martin | G03G 15/5075 358/1.16 |
| 2009/0299789 | A1 * | 12/2009 | Black | G06Q 10/06 705/7.39 |
| 2010/0100259 | A1 * | 4/2010 | Geiter | G06N 5/045 701/3 |
| 2010/0121609 | A1 * | 5/2010 | Gorinevsky | G05B 23/0281 702/183 |
| 2010/0198610 | A1 * | 8/2010 | Khalak | G06Q 50/22 705/2 |
| 2011/0116584 | A1 * | 5/2011 | Hunt, Jr. | G06T 7/20 375/350 |
| 2012/0011403 | A1 * | 1/2012 | Bock | G06F 11/263 714/30 |
| 2012/0323518 | A1 * | 12/2012 | Lechtenberg | G06Q 10/20 702/108 |
| 2015/0019065 | A1 * | 1/2015 | Bollapragada | B64F 5/40 701/29.1 |
| 2015/0235141 | A1 * | 8/2015 | Rensing | G05B 23/0278 706/52 |
| 2016/0052640 | A1 * | 2/2016 | Buehler | B64D 45/00 340/945 |
| 2016/0127178 | A1 * | 5/2016 | Helgeson | G06F 11/0709 709/222 |
| 2016/0196696 | A1 | 7/2016 | Pereira | |
| 2016/0257429 | A1 * | 9/2016 | Szeto | G07C 5/008 |
| 2016/0342496 | A1 | 11/2016 | Cahill et al. | |
| 2016/0364285 | A1 | 12/2016 | Swayne et al. | |
| 2017/0088290 | A1 | 3/2017 | Szeto | |
| 2017/0166328 | A1 * | 6/2017 | Ethington | B64F 5/60 |
| 2017/0291723 | A1 * | 10/2017 | Reddy | B64D 45/00 |
| 2018/0011481 | A1 * | 1/2018 | Smit | B64F 5/60 |
| 2018/0197351 | A1 * | 7/2018 | Dong | G07C 5/008 |

OTHER PUBLICATIONS

Mathur, Amit, Data mining of aviation data for advancing health management Proceedings of SPIE, Jul. 16, 2002 (Year: 2002).*
Felke, Tim, Knowledge Management for Maintenance of Complex Systems Honeywell, Apr. 21, 2009 (Year: 2009).*
Fault-Free Flying Aerospace Technology, Jul. 19, 2011 (Year: 2011).*
Wei, Lou, Prediction of the Aircraft Fault Maintenance Sorties Based on Least Squares of Linear Regression 2012 3rd International

(56) References Cited

OTHER PUBLICATIONS

Conference on System Science, Engineering Design and Manufacturing Informatization, 2012 (Year: 2012).*

Gerdes, Mike, Predictive Health Monitoring for Aircraft Systems using Decision Trees Linkoping University, 2014 (Year: 2014).*

Uskodzen, Prognozowanie et al., Aircraft Fault Forecasting at Maintenance Service on the Basis of Historic Data and Aircraft Parameters, Maintenance and Reliability, vol. 19, No. 4, 2017 (Year: 2017).*

Tagliente, Daniel A. et al., Dynamic Fault Monitoring and Fault-Based Decision Making in Vehicle Health Management Systems 2017 IEEE Autotestcon, 2017 (Year: 2017).*

Barkat, M. et al., A Method of Reporting and Prioritizing Faults for Aircraft Downtime Reduction SAE International, Technical Paper 2017-01-2125, 2017 (Year: 2017).*

Extended European Search Report, Application No. 18177009.0-1222, dated Nov. 7, 2018, 8 pages.

* cited by examiner

| FL | FAULT A REPORTED | FAULT A VERIFIED | FAULT A SPURIOUS? | FAULT B REPORTED | FAULT B VERIFIED | FAULT B SPURIOUS? |
|---|---|---|---|---|---|---|
| 1 | 1 | 1 | 0 | 0 | 0 | 0 |
| 3 | 0 | 0 | 0 | 0 | 0 | 0 |
| 5 | 1 | 0 | 1 | 0 | 0 | 0 |
| 7 | 1 | 1 | 0 | 1 | 1 | 0 |
| 9 | 1 | 1 | 0 | 0 | 0 | 0 |
| 11 | 1 | 0 | 1 | 1 | 1 | 0 |
| 13 | 0 | 0 | 0 | 0 | 0 | 0 |
| 15 | 0 | 0 | 0 | 0 | 0 | 0 |
| 17 | 1 | 0 | 1 | 0 | 0 | 0 |
| 19 | 1 | 1 | 0 | 1 | 0 | 1 |
| 21 | 0 | 0 | 0 | 0 | 0 | 0 |
| 23 | 1 | 0 | 1 | 1 | 1 | 0 |
| 25 | 1 | 1 | 0 | 0 | 0 | 0 |
| 27 | 1 | 1 | 0 | 1 | 0 | 1 |
| 29 | 1 | 0 | 1 | 1 | 1 | 0 |

| FL | FAULT C REPORTED | FAULT C VERIFIED | FAULT C SPURIOUS? | FAULT D REPORTED | FAULT D VERIFIED | FAULT D SPURIOUS? |
|---|---|---|---|---|---|---|
| 1 | 0 | 0 | 0 | 1 | 1 | 0 |
| 3 | 0 | 0 | 0 | 0 | 0 | 0 |
| 5 | 1 | 0 | 1 | 0 | 0 | 1 |
| 7 | 0 | 0 | 0 | 1 | 0 | 1 |
| 9 | 1 | 1 | 0 | 0 | 0 | 0 |
| 11 | 1 | 0 | 1 | 0 | 0 | 0 |
| 13 | 0 | 0 | 0 | 1 | 0 | 1 |
| 15 | 1 | 1 | 0 | 0 | 0 | 0 |
| 17 | 1 | 0 | 1 | 0 | 0 | 0 |
| 19 | 1 | 0 | 1 | 1 | 0 | 1 |
| 21 | 0 | 0 | 0 | 1 | 0 | 0 |
| 23 | 1 | 0 | 1 | 0 | 0 | 0 |
| 25 | 1 | 1 | 0 | 0 | 0 | 1 |
| 27 | 1 | 0 | 1 | 0 | 0 | 0 |
| 29 | 1 | 0 | 1 | 1 | 0 | 1 |

| FL | FAULT E REPORTED | FAULT E VERIFIED | FAULT E SPURIOUS? | FAULT F REPORTED | FAULT F VERIFIED | FAULT F SPURIOUS? |
|---|---|---|---|---|---|---|
| 1 | 1 | 1 | 0 | 0 | 0 | 0 |
| 3 | 0 | 0 | 0 | 0 | 0 | 0 |
| 5 | 0 | 0 | 0 | 0 | 0 | 1 |
| 7 | 1 | 1 | 0 | 1 | 0 | 1 |
| 9 | 0 | 0 | 0 | 0 | 0 | 0 |
| 11 | 0 | 0 | 0 | 1 | 0 | 1 |
| 13 | 0 | 0 | 0 | 0 | 0 | 1 |
| 15 | 1 | 0 | 0 | 0 | 0 | 1 |
| 17 | 1 | 1 | 0 | 0 | 0 | 1 |
| 19 | 0 | 0 | 0 | 0 | 0 | 1 |
| 21 | 1 | 1 | 0 | 0 | 0 | 1 |
| 23 | 1 | 1 | 1 | 1 | 0 | 1 |
| 25 | 0 | 0 | 0 | 0 | 0 | 0 |
| 27 | 1 | 1 | 0 | 0 | 0 | 1 |
| 29 | 1 | 0 | 1 | 1 | 0 | 1 |

FIG. 7

TABLE 2: FAULT REPORTED VERSUS FLIGHT LEG

| FL | FAULT A REPORTED | FAULT A VERIFIED | FAULT A SPURIOUS? | FAULT B REPORTED | FAULT C REPORTED | FAULT D REPORTED | FAULT E REPORTED | FAULT F REPORTED |
|---|---|---|---|---|---|---|---|---|
| 1 | 1 | 1 | 0 | 0 | 0 | 1 | 1 | 0 |
| 2 | 0 | 0 | 0 | 1 | 1 | 1 | 0 | 1 |
| 3 | 0 | 0 | 0 | 0 | 0 | 0 | 0 | 0 |
| 4 | 1 | 1 | 0 | 1 | 0 | 0 | 1 | 0 |
| 5 | 1 | 0 | 1 | 0 | 1 | 1 | 0 | 1 |
| 6 | 0 | 0 | 0 | 0 | 0 | 0 | 1 | 0 |
| 7 | 1 | 1 | 0 | 1 | 0 | 1 | 1 | 1 |
| 8 | 0 | 0 | 0 | 0 | 0 | 1 | 0 | 0 |
| 9 | 1 | 1 | 0 | 1 | 1 | 0 | 0 | 0 |
| 10 | 0 | 0 | 0 | 1 | 0 | 0 | 1 | 0 |
| 11 | 1 | 0 | 1 | 1 | 1 | 1 | 0 | 1 |
| 12 | 0 | 0 | 0 | 0 | 1 | 0 | 1 | 0 |
| 13 | 0 | 0 | 0 | 0 | 0 | 1 | 0 | 1 |
| 14 | 1 | 1 | 0 | 1 | 0 | 0 | 1 | 0 |
| 15 | 0 | 0 | 0 | 0 | 1 | 0 | 1 | 1 |
| 16 | 0 | 0 | 0 | 0 | 0 | 1 | 0 | 0 |
| 17 | 1 | 0 | 1 | 0 | 1 | 0 | 1 | 0 |
| 18 | 1 | 1 | 0 | 1 | 1 | 0 | 0 | 1 |
| 19 | 1 | 1 | 0 | 1 | 1 | 1 | 0 | 1 |
| 20 | 0 | 0 | 0 | 0 | 0 | 1 | 1 | 0 |
| 21 | 0 | 0 | 0 | 0 | 0 | 1 | 1 | 1 |
| 22 | 0 | 0 | 0 | 1 | 0 | 0 | 1 | 0 |
| 23 | 1 | 0 | 1 | 1 | 1 | 0 | 1 | 1 |
| 24 | 0 | 0 | 0 | 0 | 0 | 1 | 0 | 0 |
| 25 | 1 | 1 | 0 | 0 | 1 | 1 | 0 | 1 |
| 26 | 1 | 1 | 0 | 1 | 1 | 0 | 1 | 1 |
| 27 | 1 | 1 | 0 | 1 | 1 | 0 | 1 | 1 |
| 28 | 0 | 0 | 0 | 0 | 0 | 1 | 0 | 1 |
| 29 | 1 | 0 | 1 | 1 | 1 | 1 | 1 | 1 |
| 30 | 1 | 1 | 0 | 0 | 0 | 0 | 1 | 0 |

FIG. 8

TABLE 3: BINOMIAL LOGISTIC REGRESSION RESULTS

| FLIGHT LEG | NUISANCE FAULTS FROM LRU A | | NUISANCE FAULTS FROM LRU B | |
|---|---|---|---|---|
| | ACTUAL | PREDICTED | ACTUAL | PREDICTED |
| 27 | 0 | 0 | 1 | 1 |
| 28 | 0 | 0 | 0 | 0 |
| 29 | 1 | 1 | 0 | 0 |
| 30 | 0 | 0 | 0 | 0 |

| FLIGHT LEG | NUISANCE FAULTS FROM LRU C | | NUISANCE FAULTS FROM LRU D | |
|---|---|---|---|---|
| | ACTUAL | PREDICTED | ACTUAL | PREDICTED |
| 27 | 1 | 1 | 0 | 0 |
| 28 | 0 | 0 | 1 | 1 |
| 29 | 1 | 1 | 1 | 0 |
| 30 | 0 | 0 | 0 | 0 |

| FLIGHT LEG | NUISANCE FAULTS FROM LRU E | | NUISANCE FAULTS FROM LRU F | |
|---|---|---|---|---|
| | ACTUAL | PREDICTED | ACTUAL | PREDICTED |
| 27 | 0 | 0 | 1 | 1 |
| 28 | 0 | 0 | 1 | 1 |
| 29 | 1 | 0 | 1 | 1 |
| 30 | 1 | 0 | 0 | 0 |

FIG. 9

REPORTING AND PRIORITIZING FAULTS FOR AIRCRAFT DOWNTIME REDUCTION

BACKGROUND

Exemplary embodiments pertain to the art of aircraft maintenance, and more particularly to aircraft maintenance planning.

The exponential increase in the number of aircrafts and air travelers has triggered new innovations which aim to make airline services more reliable and consumer friendly. Quick and efficient maintenance actions with minimum downtime are the need of the hour. Areas that have a large potential for improvement in this regard are the real time use of diagnostic data, filtering/elimination of nuisance faults and machine learning capabilities with respect to maintenance actions.

BRIEF DESCRIPTION

Disclosed is a computer-implemented method for maintenance planning for an aircraft. The method includes retrieving, via a processor, a data transmission comprising a plurality of component faults from an aircraft processor while the aircraft is in flight. The processor executes, using a prediction engine, a predictive fault list based on the component faults. The predictive fault list includes a plurality of weighted predictions of authentic component faults and nuisance component faults. The processor prioritizes the weighted predictions of authentic component faults, and generates a maintenance checklist prioritized based on the weighted prediction of authentic component faults. The processor then outputs the prioritized maintenance checklist on an operatively connected maintenance planning device.

Also disclosed is a system for aircraft maintenance planning that includes a processor configured to retrieve a data transmission having a plurality of component faults from an aircraft processor while the aircraft is in flight. The processor constructs, via a prediction engine, a predictive fault list based on the component faults. The predictive fault list having a plurality of weighted predictions of authentic component faults and nuisance component faults. The processor prioritizes, via the prediction engine, the weighted predictions of authentic component faults, and generates a maintenance checklist prioritized based on the weighted prediction of authentic component faults. The processor then output the prioritized maintenance checklist on an operatively connected maintenance planning device.

Also disclosed is a non-transitory computer readable medium that includes a computer program product configured to, when executed on a processor, perform a method for aircraft maintenance planning. The method includes retrieving, via a processor, a data transmission comprising a plurality of component faults from an aircraft processor while the aircraft is in flight. The processor executes, using a prediction engine, a predictive fault list based on the component faults. The predictive fault list includes a plurality of weighted predictions of authentic component faults and nuisance component faults. The processor prioritizes the weighted predictions of authentic component faults, and generates a maintenance checklist prioritized based on the weighted prediction of authentic component faults. The processor then outputs the prioritized maintenance checklist on an operatively connected maintenance planning device.

BRIEF DESCRIPTION OF THE DRAWINGS

The following descriptions should not be considered limiting in any way. With reference to the accompanying drawings, like elements are numbered alike:

FIG. 7 is a table indicative of the history of nuisance faults fed to the predictive engine according to one embodiment;

FIG. 8 is a table indicative of reported faults versus particular flight legs according to one embodiment; and FIG. 9 is table showing results of a binomial logistic regression according to one embodiment.

DETAILED DESCRIPTION

A detailed description of one or more embodiments of the disclosed apparatus and method are presented herein by way of exemplification and not limitation with reference to the Figures.

Although, numerous line-replaceable units (LRUs) installed on the aircraft generate massive amounts of diagnostic data to detect any possible issue or LRU failure, it is seldom used in real time. The turnaround time for LRU maintenance can be greatly reduced if the results of the diagnostics conducted during LRU normal operation is relayed to ground stations in real-time. This enables the maintenance engineers to plan ahead and initiate maintenance actions well before the aircraft lands and becomes available for maintenance. Handling nuisance faults generated during the LRU diagnostic tests is another area with scope for improvement. The advancements in predictive analytics can be harnessed to identify the possibility of reported fault being a nuisance fault. The current method to identify nuisance faults involves a maintenance engineer performing an initiated test after the aircraft touches down. Any time spent in planning maintenance actions to rectify these faults and parts procured for the same is wasted.

Disclosed herein are systems and methods that address the aforementioned problems by the use of on-board automated failure mode effects analysis (FMEA), predictive analytics and machine learning to suggest actions for maintenance engineers. The on-board automated FMEA allows for critical diagnostic data to be identified, transmitted and used in real time. Real time as used herein means substantially instantaneous use while an aircraft is still in flight. According to some embodiments, predictive analytics enables the forecasting of nuisance faults by a predictive algorithm running on a system processor, and prioritizing the reported faults based on the results of the same by the system processor.

The current state of the art technology employs transmission of maintenance data generated from the LRUs on the aircraft to ground stations using Aircraft Communications Addressing and Reporting System (ACARS). ACARS is currently being used by a number of aircrafts while most of them simply store away the fault data generated, to be verified after touch down. In this situation, the maintenance engineer is deprived of any "heads-up" information which might enable him to plan the maintenance actions smartly.

Also, the aircrafts with ACARS on-board transmit the complete set of fault data reported to the ground personnel. This might leave the maintenance engineer indecisive about the faults to be addressed on priority, when there are multiple faults reported from multiple LRUs.

Figure 1:
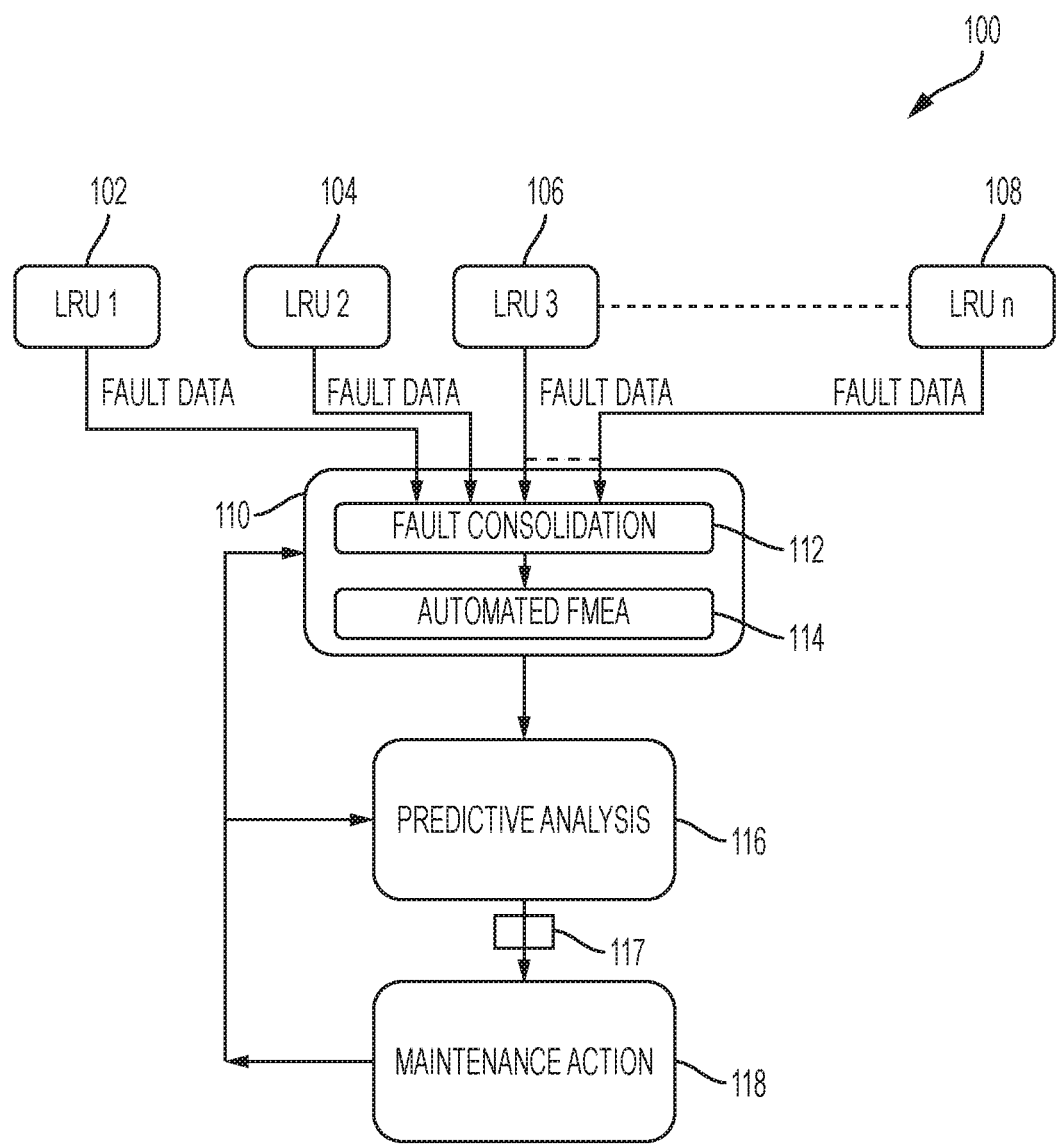
FIG. 1 is a system diagram for reporting and prioritizing faults in an aircraft according to one embodiment.

FIG. 1 depicts a flow diagram of a system 100 for reporting and prioritizing faults in an aircraft, according to one embodiment. The proposed system can be broadly divided into the following sub-system/functional blocks: I. Critical Fault list generation using Automated FMEA; II. Predictive analysis to identify nuisance faults; and III. Maintenance log feedback to improve the accuracy of fault reporting. As shown in FIG. 1, the aircraft may include a plurality of LRUs including LRU 1 (102), LRU 2 (104), LRU 3 (106), and LRU 4 (108). Each of the LRUs 102-108 output fault data to an onboard Automated FMEA system processor 110. FMEA 110 generates a critical fault list which serves as input to the predictive analysis engine 116. The generation of critical fault list is based on a weight for each fault determinative of how important the resolution of that fault is to the safety and functionality of the LRU and the aircraft. For example, an overheat fault may be considered more important and higher on the maintenance list than a fault associated with water pressure in the lavatory. The predictive analysis engine in turn prioritizes the critical fault list and outputs a maintenance checklist that is used by the maintenance engineers to plan and perform maintenance actions 118. A digital maintenance report 117 is generated after the maintenance actions are performed which serves as an input to the onboard Automated FMEA system processor 114 and the ground based predictive analysis engine (as shown hereafter in FIG. 2, block 226).

Considering system 100 in greater detail, one embodiment uses the FMEA 110 to analyze the impact of the LRU failures as reported through real-time fault data, on the overall aircraft health. Impact of a fault generated by the LRU can lead to the LRU either being in a fully functional state due to availability of redundant elements, partially functional state where the LRU can perform limited functionality or a completely non-functional state. A fault generated by an LRU can affect the aircraft operations based on the criticality of the LRU. A system may be more critical, and as such, any failure affecting the critical system can influence the aircraft operation. Other systems may be non-critical and hence would not affect the aircraft operation but may affect the airline service quality. The third parameter of interest is the immediate need for maintenance action and how much time it would require to perform the maintenance action. For example a fault such as sensor failure will have a direct impact on the LRU functionality. It can affect the aircraft operation if it is a critical LRU and may require an immediate maintenance action causing that fault to be classified as critical. Failure of a non-critical system, for example, entertainment system does not affect aircraft operation and hence can be classified as a non-critical fault. All faults generated by multiple LRUs go through this automated process to generate the list of critical faults.

The critical fault data is then transmitted to a secure cloud server using existing aircraft transmission protocols. The automated FMEA 114 is employed to determine whether a fault generated by an LRU is critical and whether it impacts the safe operation of the flight. This assessment is done by an on-board system processor, in real time, when the faults are reported by the operational electronic LRUs 102-108. Three parameters are considered for assessing the impact of a fault: The first being the impact on the LRU that generated the fault, second is the impact of that fault on the aircraft operation and third is the maintenance requirement in terms of time and effort. A fault criticality can be computed through an exemplary function:

$$\text{Critical Fault} = f(\text{LRU Impact, Aircraft impact, Maintenance time}) \quad (1)$$

The time related parameters from this data are fed as input to the FMEA to improve the accuracy of critical fault identification. The results of the initiated test are used to improve the performance of the predictive algorithm over time.

At block 116, predictive algorithms are applied on the received data to forecast a nuisance fault based on historical data and generate a prioritized fault list. The LRUs 102-108 could be any one of a fire detection card, an overheat detection card, a smoke detection card, a fire sensor, an overheat sensor, a smoke detector or any other type of sensor on an aircraft. The prioritized fault list is finally presented to the maintenance engineer via an output processor/interface device such as a laptop/tablet. The fault list is prioritized by the system processor in decreasing order of maintenance time and accuracy, according to one embodiment.

Embodiments disclosed herein describe a system processor that receives fault data from different LRUs 102-108, consolidates the fault data 112, and generates the list of critical faults based on three parameters: The impact of the fault on the LRU, impact of the fault on the safe aircraft operation, average maintenance time to rectify the fault. The system performs an automated FMEA 114 on the consolidated fault data 112 to assess the impact of each respective fault on the overall operation of the LRU associated with that fault. At predictive analysis block 116, the average time taken for maintenance is determined from historical MRO data fed into the system initially and updated continuously from the maintenance engineer's logs. This in conjunction with other parameters such as maintenance time and Design Assurance Level (DAL) of the LRU are used to assign priorities to the list of reported faults, this entire operation occurs asynchronously on the ground when the LRUs 102-108 report a fault and transmit the faults to the ground system.

Figure 2:
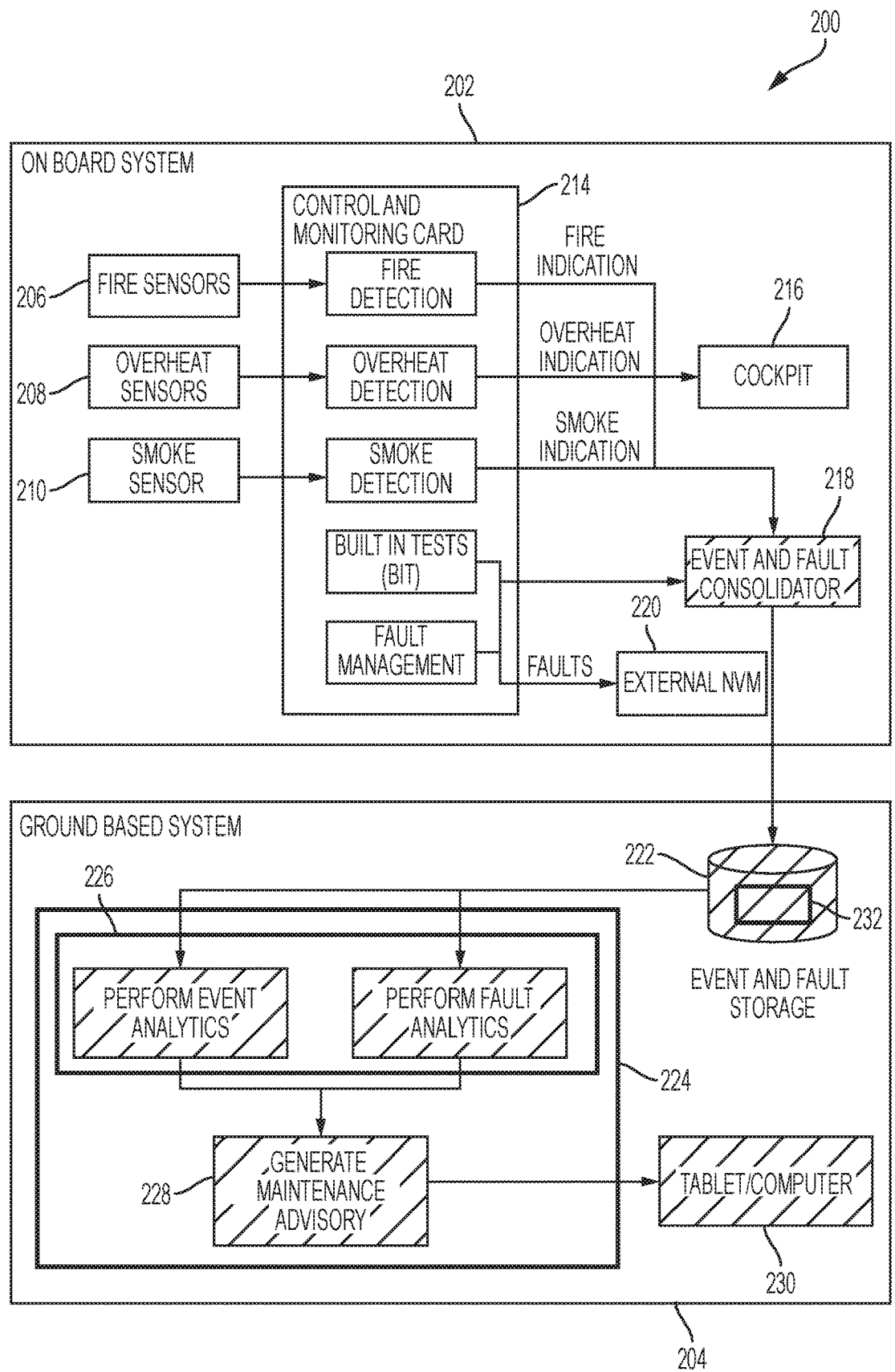
FIG. 2 is a system schematic for reporting and prioritizing faults in an aircraft according to one embodiment (for Fire Protection System LRU)

FIG. 2 is a schematic for a system 200 for reporting and prioritizing faults in an aircraft, according to one embodiment. As shown in FIG. 2, system 200 includes an on-board system 202 that is operational on an aircraft, and a ground-based system 204 that is operational at a maintenance base for the aircraft.

On-board system 202 includes a plurality of LRUs including, for example, one or more fire sensors 206, one or more overheat sensors 208, and one or more smoke sensors 210. System 202 includes a control and monitoring processor (e.g., a control and monitoring card) 214 that receives inputs from sensors 206-210, and routes appropriate information to an external NVM 220, a control module in the cockpit 216 of the aircraft, and to an event and fault consolidator 218. An event can be any undesirable condition that demands a maintenance action. It could be one of the he following for FPS LRU system 202: 1. Fire condition, 2. Overheat Condition, 3. Smoke, 4. Circuit Card Fault, 5. Sensor Fault, and 6. Communication Faults. For example, control and monitoring processor 214 includes a control engine configured to receive the inputs from sensors 206-210, and route fire indication signals, overheat indication signals and smoke indication signals to the event and fault consolidator 218 and to the cockpit 216 simultaneously. The faults from the built in tests and fault management are fed to the external NVM 220 and event and fault consolidator 218 simultaneously.

Ground-based system 204 includes an event and fault storage 222, and a processor 224. The event and fault storage is configured to receive and store the critical fault list transmitted by the on-board system in addition to storing the historical fault data 232. The data transmission includes a plurality of component faults from the sensors 206-210. The component faults are indicative of detected events that occurred while the aircraft is in flight. The processor 224 includes a prediction engine 228 configured to retrieve data from the event and fault storage 222. The predictive engine 226 is configured to prioritize the critical fault list based on the predictive analysis results. An authentic sensor fault is an actual sensor fault that indicates a real event that has occurred on the aircraft. A nuisance fault is an inauthentic sensor fault that results from an anomaly other than an actual detected event. A nuisance fault is a false reading from one or more of the sensors 206-210.

Constructing the predictive fault list includes performing event analytics and performing fault analytics. For example, the processor 224 may prioritize, via the prediction engine 226, the critical fault list containing authentic component faults and nuisance component faults, and using the output of the prediction engine 226, generate maintenance advisory. Accordingly, the prediction engine 226 may prioritize the authentic component faults, and generate a maintenance checklist that is prioritized by the prediction engine based on the maintenance parameters. The output (the maintenance advisory) includes the prioritized maintenance checklist. The processor 224 outputs the maintenance advisory on an operatively connected maintenance planning device 230.

The output of the FMEA 114 (FIG. 1) is a list of critical faults that are transmitted asynchronously to a secure cloud server (not shown) every time a critical fault is reported. Event and fault storage 222 may be considered part of the cloud server or may be operatively connected to the cloud server. The fault storage 222 also includes archived fault report logs having a part failure history 232 for each sensor indicated in the plurality of component faults from the aircraft processor while the aircraft was in flight. At the ground station 204, predictive algorithms are applied by the prediction engine 226 on the archived fault report logs to identify any possibilities of the reported fault being a nuisance fault specific to the particular LRU (one of sensors 206-210) and an aircraft type indicative of a particular type of aircraft on which the on-board system 202 is operating. The results of the prediction engine 226 are used by the processor 224 to assign priorities to the reported faults based on maintenance time and accuracy of information observed from the part failure history 232. The part failure history 232 also includes one or more actions taken responsive to an identified failure in a past aircraft flight path. The processor 224 lists the faults in decreasing order of their priorities, which are then updated in the storage device 222 (and/or the cloud server). The maintenance engineer can access this data immediately at the ground station. The system also suggests possible components that may require procurement based on the prior maintenance reports (prior failure history 232) and also the maintenance action undertaken when the same fault was reported during previous flight legs.

According to one embodiment, the processor 224 evaluates, based on the part failure history 232, for each sensor (one or more of sensors 206-210) associated with a particular sensor fault in the plurality of component faults from the aircraft processor 218, a relationship between 1) an aircraft flight path on which the aircraft associated with the on-board system 202 is operating, 2) the particular sensor fault, and 3) a prediction hit or miss rate for the sensor associated with the sensor fault. The prediction hit or miss rate is stored as part of the part failure history 232.

This enables the maintenance personnel to receive a fault list prioritized based on the probable authenticity of the fault. By having a prioritized list that is likely to be authentic and actionable, the list can aid in timely procurement of parts that have particularly long turn-around times, better plan maintenance actions, thereby reducing the downtime and passenger discomfort through delayed flights. For example, while the aircraft is still in flight, receipt and analysis of the fault data can save many hours of aircraft down time that may be needed to route parts to the anticipated maintenance base at the arrival airport of the aircraft. Once the maintenance actions are complete, the maintenance engineer feeds the following data back to the system: Parts procured for replacement, turnaround time for the part, maintenance action/repair needed, time taken for the past repair, genuineness of the fault and the nature of the maintenance action performed (scheduled or unscheduled). This assists the processor 224 to improve the future results of the prediction engine 226 based on the verified hit or miss information of the component faults, relationship between the aircraft flight path and the component faults.

Figure 3:
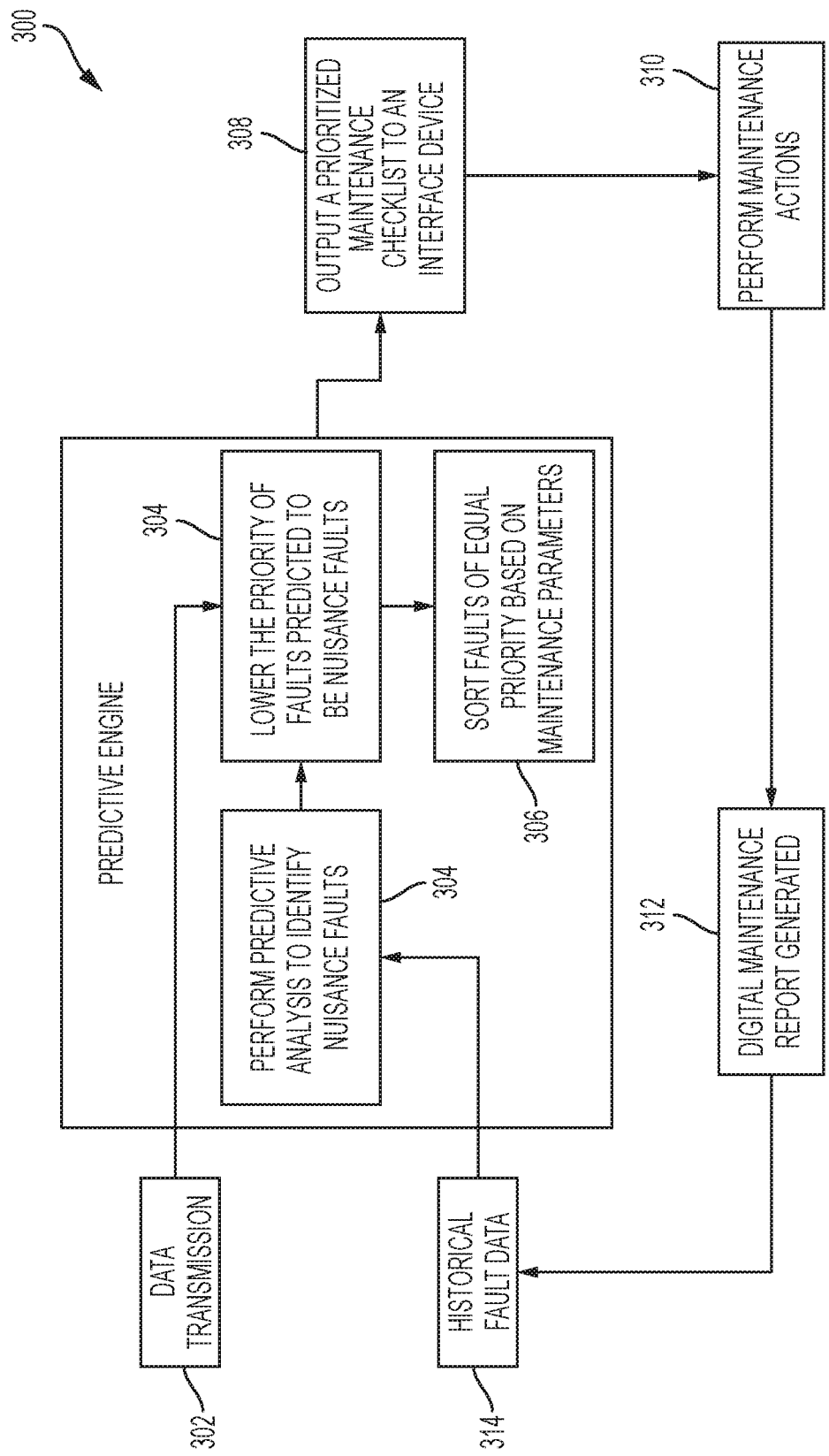
FIG. 3 is a flow diagram of a method for prioritizing reported faults in an aircraft according to one embodiment.

FIG. 3 is a flow diagram of an exemplary method for reporting and prioritizing faults in an aircraft using system 200, according to one embodiment. As shown in block 302, the prediction engine 226 is configured to retrieve a data transmission from a plurality of component faults from the aircraft processor 218 while the aircraft is in flight. The prediction engine 226 lowers the priority of the faults predicted to be nuisance faults as shown in block 304.

As shown in block 306, the prediction engine 226 sorts the faults of equal priority based on maintenance parameters. Maintenance parameters can include, for example, parts procured for replacement of a faulty part, turnaround time for the part, maintenance action(s) and/or repairs needed in connection with the fault, and time taken in the past for a similar or the same repair.

The prediction engine 226 sorts the faults using a predictive fault list. The predictive fault list includes a plurality of weighted predictions of authentic component faults and nuisance component faults. Constructing the predictive fault list includes retrieving, via the processor, a part failure history for each sensor indicated in the plurality of component faults from the aircraft processor while the aircraft is in flight, and evaluating, based on the part failure history, for each sensor associated with a particular sensor fault in the plurality of component faults from the aircraft processor, a relationship between 1) an aircraft flight path, 2) the particular sensor fault, and 3) a prediction hit or miss rate for the sensor associated with the sensor fault. The evaluating process includes predicting, for each of the plurality of component faults, the weighted prediction of authentic component faults based on the relationship between the aircraft flight path, the sensor fault, and the prediction hit or miss rate for the sensor associated with the sensor fault.

According to one embodiment, the aircraft flight path comprises a predetermined flight leg unique to the aircraft flight path. The aircraft flight path includes one or more of a flight parameters including but not limited to vector, an engine speed, and an altitude of the aircraft that is currently in flight. The flight vector, engine speed, and or the altitude are readings of the aircraft operational data taken at the time of the particular sensor fault.

At block 308, the processor 224 then generates and outputs a prioritized maintenance checklist that is prioritized based on the probable authenticity of a fault as per the results of the predictive analysis performed by the predictive engine. In some aspects, the processor 224 obtains a prediction accuracy report (e.g., the part failure history 232) indicative of the accuracy for each of the past predictions of authentic component faults and nuisance component faults.

In other aspects the prioritization of the critical faults is based on other factors associated with procuring a specific piece of replacement hardware to remedy the fault. Examples of these factors include i) turnaround time for the part and the time taken for the past repair.

The critical fault data generated by the Automated FMEA block is relayed to a secure cloud server. Each reported fault is next compared with the results of a predictive analysis algorithm applied on the historical data of the corresponding fault. To ensure that only the recent fault history affects the output of the predictive analysis algorithm, data corresponding to only the last N flight legs are considered. The value of N depends on the LRU under consideration since any hidden trend in the reported faults could be spread over different number of flight legs for different faults. The initial value of N is determined from parameters such as Mean Time between failures (MTBF), that are provided by the LRU manufacturers. The value of N can be updated over time based on the field performance of the LRU under consideration.

At block 308, the processor 224 outputs the prioritized maintenance checklist on an operatively connected maintenance planning device 230. The planning device 230 may be a tablet or computer operated by a maintenance personnel.

The fault detected and transmitted from the onboard systems has a mixture of nuisance and genuine faults. The generated fault list is verified by the Maintenance Engineer through an initiated test on the LRUs suspected to have issues while the aircraft is on ground. Maintenance actions are performed for the LRUs that continue to fail the BIT test on ground. The faults reported by LRUs showcasing unusual behavior in built-in-test results are marked as nuisance faults. As shown in block 310, maintenance actions are performed by a user, and at block 312 the digital maintenance report is generated by the system indicative of the accuracy of the output prioritized maintenance checklist and the predicted analysis results. The historical fault data 314 is updated by the processor, and fed back into the predictive analysis engine for prediction improvement.

Figure 4:
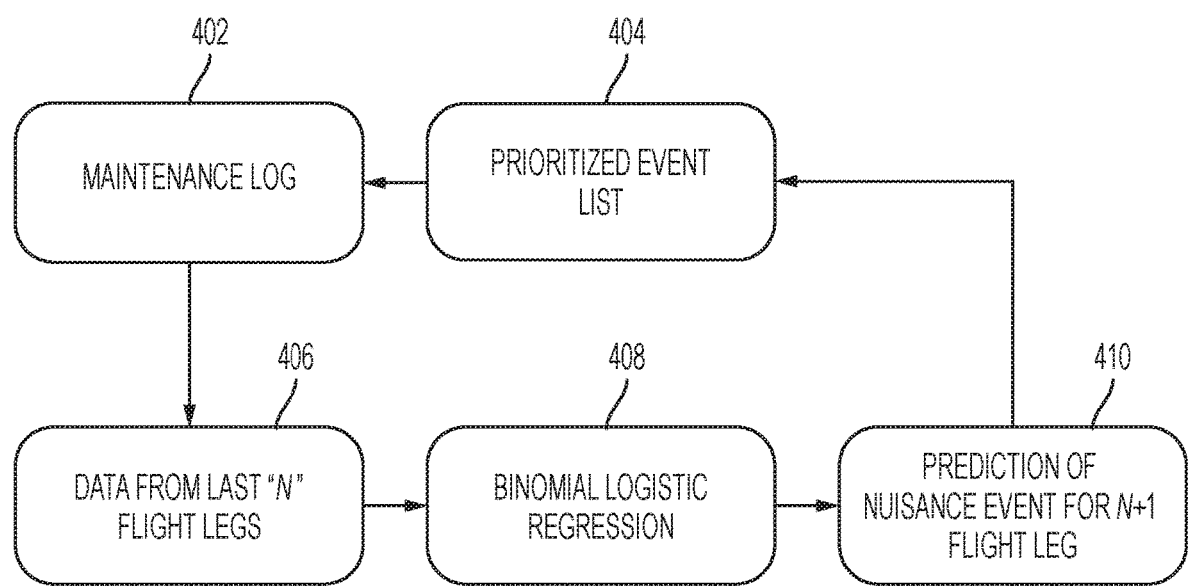
FIG. 4 is a flow diagram for predicting nuisance faults among the faults reported by the aircraft during specific flight leg according to one embodiment.

FIG. 4 is a flow diagram for predicting faults in an aircraft according to one embodiment. The prediction engine 226 is continually self-improved by taking in prior hit or miss predictions and associating relative weight to the binomial logistic regression. As shown in FIG. 4, the maintenance log 402 is derived by the processor 224 by generating a prioritized event list 404. The maintenance log is compared with data from the last "N" flight legs (depicted as 232 in FIG. 2). The binomial logistic regression algorithm 408 functioning as part of the prediction engine 226 takes in the data 406 and updates relative weighs for prediction based on prior accuracy. At block 410, the prediction of a nuisance event for the next flight leg N+1 is determined, then output to the following prioritized event list 404.

According to embodiments, binomial logistic regression is used for prediction of spurious faults since the outcome of the prediction is a binary sequence that forecasts the validity of the reported fault from the learning data set containing the historical data for the specific LRU and aircraft. Logistic regression is a numerical method for fitting a curve, $y=f(x)$, when y is a discrete variable. The typical use of this model is predicting y given a set of predictors x. The predictors can be continuous, discrete or a combination of both. The discrete variable y can take on one of a limited number of possible values. In the simplest case y is binary i.e., it can assume either the value 1 or 0. In this case, the model reduces to a simpler 'binomial logistic regression' model.

The ground station/cloud server acknowledges when the fault list update is received. The list of faults are assigned priority based on the predictive analytics forecast and are relayed to the maintenance engineer. After the aircraft touches down, the planned maintenance actions are put to execution. Each reported fault is cross-verified through an initiated test of the LRU and required measures are taken to fix the fault if they are discovered to be genuine. A digital maintenance report is generated against each of the reported fault which lists the details of maintenance actions performed including, but not limited to, result of initiated test conducted to validate the reported fault, parts procured for replacement, if any, turnaround time for the replaced part, maintenance action/repair performed and time taken for the repair, nature of maintenance performed—scheduled or unscheduled.

This digital report acts as input for the predictive algorithms and the on-board FMEA. The parameters captured in the report for genuineness of fault and time needed to complete maintenance actions act as direct inputs for cloud based predictive analysis and on-board FMEA respectively. The information helps the cloud based system to build their historical database thereby enabling it to forecast a more reliable probabilistic outcome. Additionally, the failure mode analysis is fed with a more reliable and recent information which improves the accuracy of impact analysis. Thus, the proposed system is imparted with the ability to get more accurate with every fight.

Preferably, any communication of aircraft data is highly secure and free from errors. Full-duplex communication may provide one approach that allows for error checking. The communications are preferably in real time and, as such, may be either radio or satellite depending on the location of the aircraft.

Figure 5:
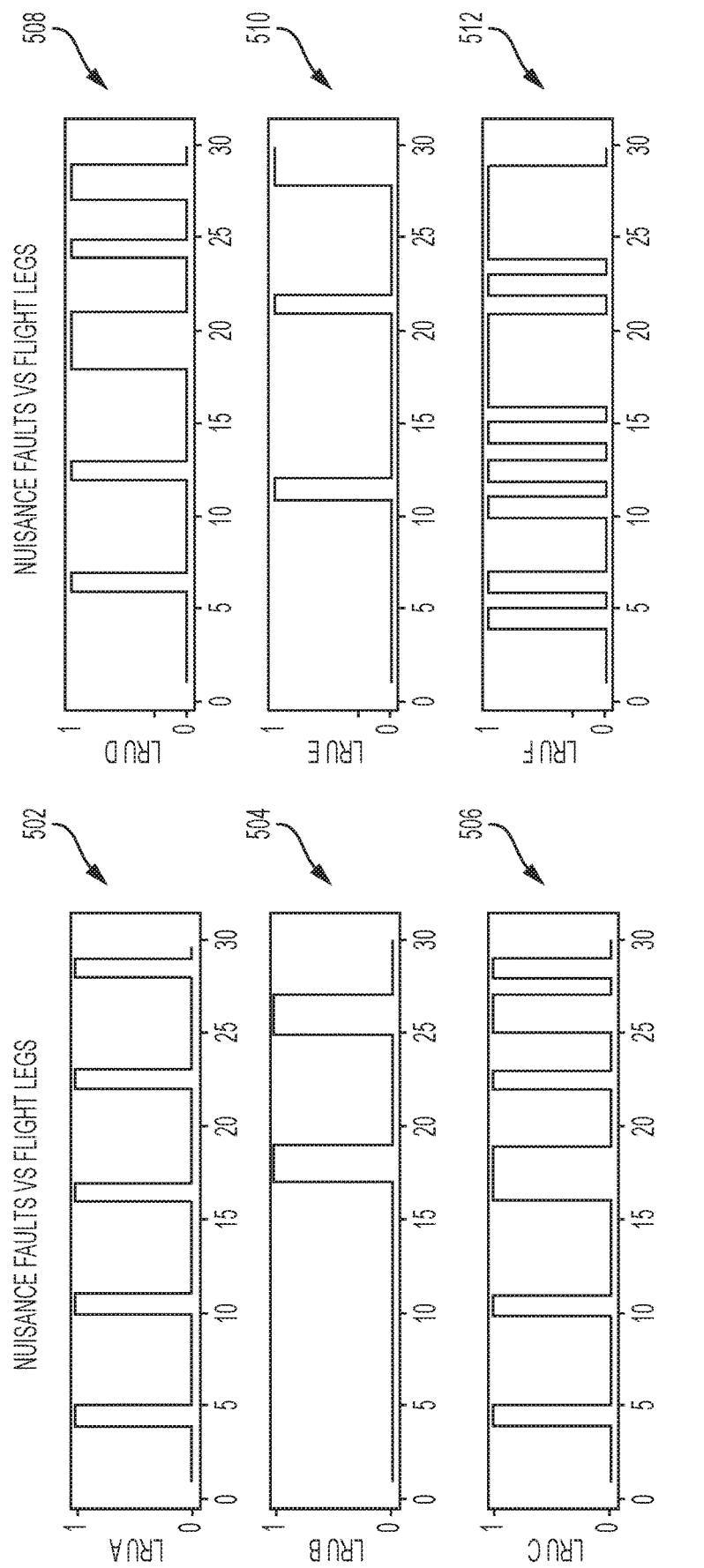
FIG. 5 is a graphical depiction of nuisance faults versus flight legs according to one embodiment.

FIG. 5 is a graphical depiction of nuisance faults versus flight legs according to one embodiment. To demonstrate the effectiveness of a binomial logistic regression in the prediction of nuisance faults, the predictive model is applied on fault data synthesized using the following approach. It is important to note that the synthesized data is embedded with an inherent trend in most cases. Referring now to FIG. 5, two graphs are shown depicting nuisance faults versus flight legs. Each graph I-VI is shown respective to a particular LRU (e.g., one of LRUs 102-108). As shown in FIG. 5, the following LRU graphs I-VI represent the following:

I. LRU A: Nuisance fault reported on every 6th flight leg;
II. LRU B: Nuisance faults reported in random, but occur in pairs;
III. LRU C: Nuisance fault reported when either LRU A or LRU B reports a nuisance fault;
IV. LRU D: Reports a nuisance fault two flight legs after LRU C reports a nuisance fault;
V. LRU E: Nuisance fault reported are random in nature; and
VI. LRU F: Nuisance fault reported when one or more of the above LRUs report a nuisance fault.

Figure 6:
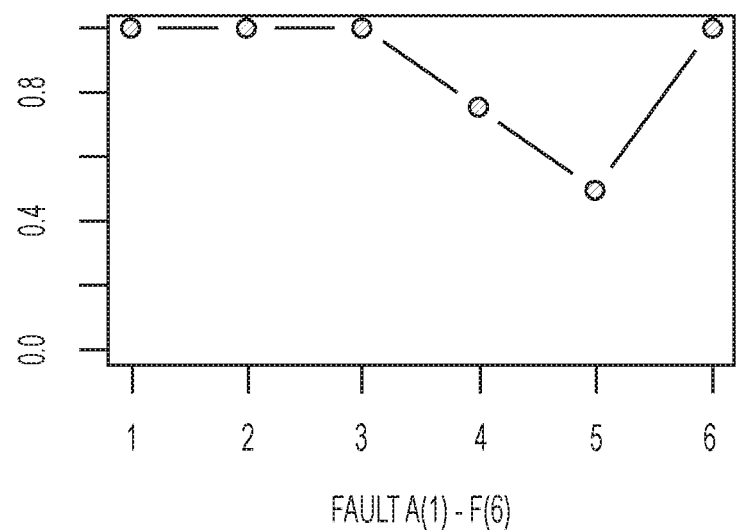
FIG. 6 is a graphical depiction of accuracy of a binomial logistic regression for faults according to one embodiment.

Referring no to FIG. 6, a graphical depiction of the accuracy of a binomial logistic regression for faults is shown, according to one embodiment. The variation of the predictive model's accuracy for the different LRUs is represented in FIG. 6. As shown in FIG. 6, the overall accuracy for the given set of inputs is (5.25/6)*100=87.5%. FIGS. 7-9 depict tables showing the data used to determine the accuracy records in FIG. 6.

FIG. 7 is a table indicative of a hit or miss record for verified and spurious faults according to one embodiment. The fault data for 30 flight legs is synthesized for 6 LRUs (A to F) using the aforementioned set of rules are plotted in FIG. 5, and the fault data for alternate flight legs for all the 6 LRUs are shown in Table 1. Referring now to Table 1 in FIG. 7, a "1" in the 'Spurious Fault' column indicates that the reported fault could not be verified during the initiated BIT whereas a 0 either indicates that the fault was not reported or the reported fault was verified during an initiated BIT.

FIG. 8 is a table indicative of reported faults versus particular flight legs according to one embodiment. The fault data reported from onboard systems to the ground stations is fed to the logistic regression model in the form of a matrix as shown in Table 2 of FIG. 8.

FIG. 9 is table showing results of a binomial logistic regression according to one embodiment. A data set containing the fault data for a set of 6 LRUs (A to F) were fed to the logistic regression model. The data from the 21 flight legs were used for training, the data from the next 5 flight legs were used to tune the accuracy of the predictions. The logistic regression model was then used to predict the possibility of the reported fault being a nuisance fault. The results of the predictions from the model are as shown in Table 3 (FIG. 9).

As seen from Table 3 of FIG. 9, the model predicts the possibility of the reported fault being a nuisance fault 100% of the time in case of LRUs A, B, C and F. In case of LRU E, the nuisance faults are completely random and hence the accuracy of prediction drops since there is no inherent trend in the input data.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A computer-implemented method for maintenance planning for an aircraft, the method comprising:
    measuring, using one or more sensors, conditions of the aircraft;
    retrieving, via a processor, a data transmission comprising a plurality of component faults from an aircraft processor while the aircraft is in flight based at least in part on measurements from the one or more sensors;
    constructing, via the processor executing a prediction engine, a predictive fault list based on the component faults, the predictive fault list having a plurality of weighted predictions of authentic component faults and nuisance component faults;
    prioritizing, via the processor, the weighted predictions of authentic component faults;
    generating, via the processor, a maintenance checklist prioritized based on the weighted prediction of authentic component faults; and
    outputting, via an output processor, the prioritized maintenance checklist on an operatively connected maintenance planning device;
    wherein constructing the predictive fault list comprises:
    retrieving, via the processor, a part failure history for each sensor indicated in the plurality of component faults from the aircraft processor while the aircraft is in flight; and
    evaluating, based on the part failure history, for each sensor associated with a particular sensor fault in the plurality of component faults from the aircraft processor, a relationship between 1) an aircraft flight path, 2) the particular sensor fault, and 3) a prediction hit or miss rate for the sensor associated with the sensor fault.

2. The computer-implemented method of claim 1, further comprising obtaining, via the processor, a prediction accuracy report indicative of an accuracy for each of the weighted predictions of authentic component faults and nuisance component faults;
    generating, via the processor, an accuracy table indicative of a relative accuracy for each of the weighted predictions; and
    configuring, via the processor, the prediction engine based on the accuracy table.

3. The computer-implemented method of claim 1, further comprising predicting, for each of the plurality of component faults, the weighted prediction of authentic component faults based on the relationship between the aircraft flight path, the sensor fault, and the prediction hit or miss rate for the sensor associated with the sensor fault.

4. The computer-implemented method of claim 3, wherein the aircraft flight path comprises a predetermined flight leg unique to the aircraft flight path.

5. The computer-implemented method of claim 4, wherein the aircraft flight path comprises one or more of a flight parameters including but not limited to flight vector, an engine speed, and an altitude.

6. A system for aircraft maintenance planning comprising:
    one or more sensors configured to measure conditions of an aircraft;
    a processor configured to:
    retrieve a data transmission comprising a plurality of component faults from the aircraft processor while the aircraft is in flight based at least in part on measurement from the one or more sensors;
    construct, via a prediction engine, a predictive fault list based on the component faults, the predictive fault list having a plurality of weighted predictions of authentic component faults and nuisance component faults;

prioritize, via the prediction engine, the weighted predictions of authentic component faults;

generate a maintenance checklist prioritized based on the weighted prediction of authentic component faults; and output the prioritized maintenance checklist on an operatively connected maintenance planning device;

wherein constructing the predictive fault list comprises:

retrieving, via the processor, a part failure history for each sensor indicated in the plurality of component faults from the aircraft processor while the aircraft is in flight; and evaluating, based on the part failure history, for each sensor associated with a particular sensor fault in the plurality of component faults from the aircraft processor, a relationship between 1) an aircraft flight path, 2) the particular sensor fault, and 3) a prediction hit or miss rate for the sensor associated with the sensor fault.

7. The system of claim 6, further comprising predicting, for each of the plurality of component faults, the weighted prediction of authentic component faults based on the relationship between the aircraft flight path, the sensor fault, and the prediction hit or miss rate for the sensor associated with the sensor fault.

8. The system of claim 7, wherein the aircraft flight path comprises a predetermined flight leg unique to the aircraft flight path.

9. The system of claim 8, wherein the aircraft flight path comprises one or more of a flight data including but not limited to flight vector, an engine speed, and an altitude.

10. A non-transitory computer readable medium comprising a computer program product configured to, when executed on a processor, perform a method for aircraft maintenance planning comprising:

one or more sensors configured to measure conditions of an aircraft;

retrieving, via the processor, a data transmission comprising a plurality of component faults from an aircraft processor while the aircraft is in flight based at least in part on measurements from the one or more sensors;

constructing, via the processor executing a prediction engine, a predictive fault list based on the component faults, the predictive fault list having a plurality of weighted predictions of authentic component faults and nuisance component faults;

prioritizing, via the processor, the weighted predictions of authentic component faults;

generating, via the processor, a maintenance checklist prioritized based on the weighted prediction of authentic component faults; and outputting, via an output processor, the prioritized maintenance checklist on an operatively connected maintenance planning device;

wherein constructing the predictive fault list comprises:

retrieving, via the processor, a part failure history for each sensor indicated in the plurality of component faults from the aircraft processor while the aircraft is in flight; and evaluating, based on the part failure history, for each sensor associated with a particular sensor fault in the plurality of component faults from the aircraft processor, a relationship between 1) an aircraft flight path, 2) the particular sensor fault, and 3) a prediction hit or miss rate for the sensor associated with the sensor fault.

11. The non-transitory computer readable medium of claim 10, further comprising obtaining, via the processor, a prediction accuracy report indicative of an accuracy for each of the weighted predictions of authentic component faults and nuisance component faults;

generating, via the processor, an accuracy table indicative of a relative accuracy for each of the weighted predictions; and configuring, via the processor, the prediction engine based on the accuracy table.

12. The non-transitory computer readable medium of claim 10, further comprising predicting, for each of the plurality of component faults, the weighted prediction of authentic component faults based on the relationship between the aircraft flight path, the sensor fault, and the prediction hit or miss rate for the sensor associated with the sensor fault.

13. The non-transitory computer readable medium of claim 12, wherein the aircraft flight path comprises a predetermined flight leg unique to the aircraft flight path.

14. The non-transitory computer readable medium of claim 13, wherein the aircraft flight path comprises one or more of a flight vector, an engine speed, and an altitude.

* * * * *